Patented June 24, 1930

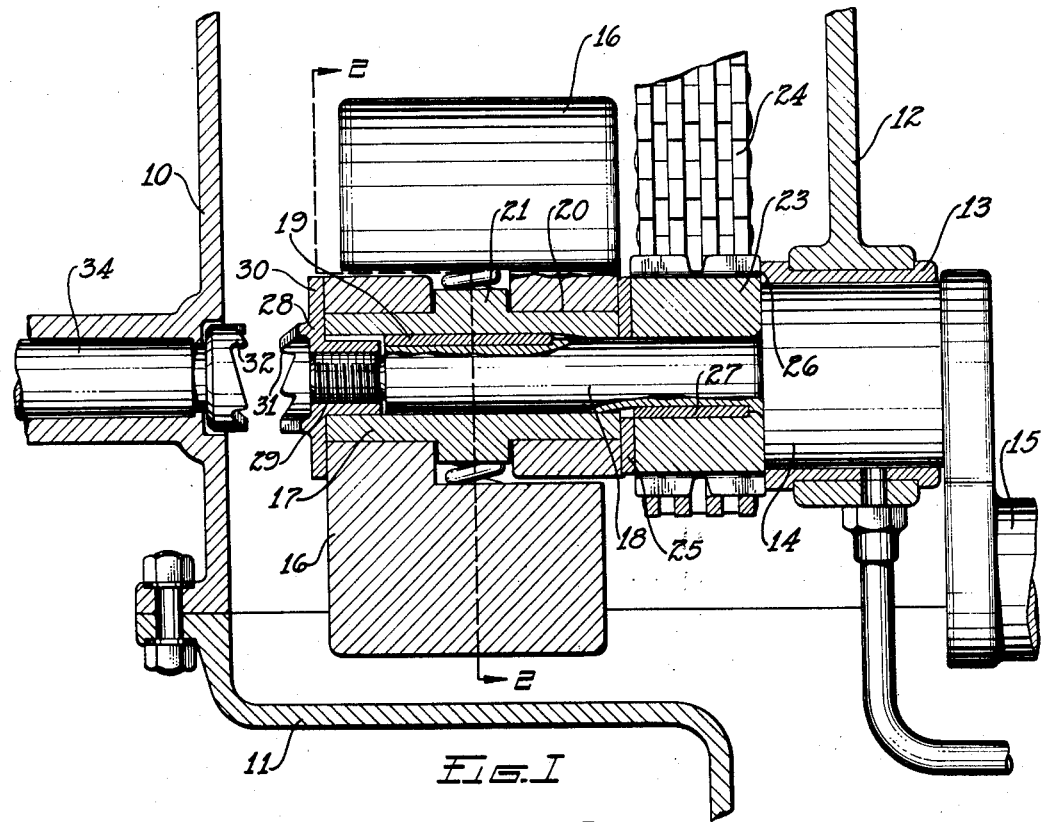
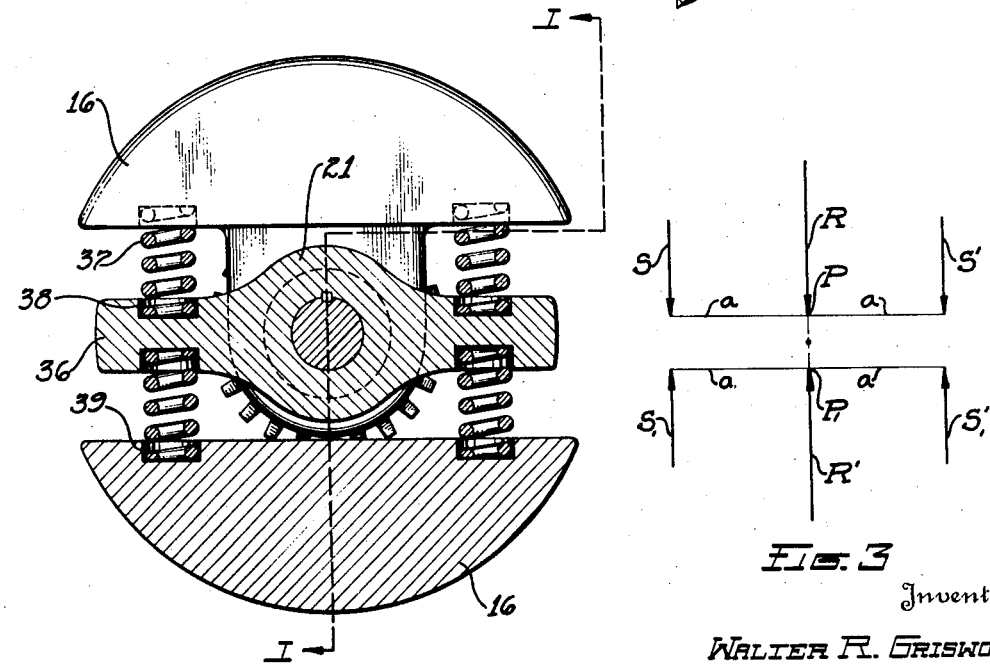

1,766,899

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

INTERNAL-COMBUSTION ENGINE

Application filed December 13, 1926. Serial No. 154,371.

This invention relates to internal combustion engines and particularly to means for damping torsional vibration in the crankshafts of such engines.

One object of the invention is to provide damping means which shall be capable of dissipating the energy of vibration in engines of large size and power.

Another object of the invention is to provide a vibration damper having oscillatory inertia members, in which the bearing friction area shall be larger and the frictional resistance greater in proportion to the size and weight of the oscillatory mass than in previously known damping devices.

A further object of the invention is to provide damping means which shall be simple and inexpensive, and which may be easily assembled so that parts subjected to wear may be readily renewed.

Other objects of the invention will appear from the following description taken in connection with the drawings, which form a part of this specification, and in which:

Fig. 1 is a longitudinal vertical section through a portion of an internal combustion engine embodying the invention, the section being substantially on the line 1—1 of Fig. 2;

Fig. 2 is a transverse section substantially on the line 2—2 of Fig. 1, and

Fig. 3 is a diagram of some of the forces acting on the damper shown in Figs. 1 and 2.

Referring to the drawings, 10 represents the crankcase of an internal combustion engine having a removable lower cover or oil pan 11 and provided with a transverse web 12. Such webs support suitable alined bearings, such as shown at 13 for an engine crankshaft 14, the latter having the usual integral cranks 15, each of which is connected by a connecting rod with a piston mounted in one of the engine cylinders. This piston and connecting rod structure is not shown in the drawing, but is of the usual construction.

The damping means of this invention is illustrated as mounted at or adjacent the end of the crankshaft 14. It is in the form of opposed or complementary inertia members 16, which are mounted co-axially with the crankshaft and upon a suitable bearing part thereof. As shown, this bearing part is a member 17 formed separately from the crankshaft but supported upon and keyed to the reduced end 18 thereof as by a key 19. The bearing portions of the member 17 are indicated at 20. These bearing portions are on either side of a centrally arranged flange 21, shown as an integral part of the bearing member. Adjacent the member 17 is a gear or sprocket 23 which drives a chain 24 by means of which the engine crankshaft, the generator, and other engine accessories may be driven. The forward end of the sprocket 23 abuts against a washer 25 and it is axially positioned between this washer and a shoulder 26, formed by reducing the end of the shaft and is keyed to the shaft for rotation therewith by means of a key 27. The rear end of the member 17 and the rear end of one of the inertia members 16 abut against the washer 25, and this member 17 and the other inertia member 16 are retained on the shaft by a nut 28 on the threaded end 29 of the crankshaft. The nut operates through a flange 30 against the outer end of the member 17, and the flange extends radially far enough to hold the inertia member 16 on its bearing. Thus the entire member 17 turns with the crankshaft as a part thereof and of course the bearing portions 20 turn with it as does also the gear or sprocket 23. The inertia members 16, however, are free to turn on their bearing portions 20 except as is hereinafter described.

The end of the nut 28 is preferably formed with clutch teeth 31 which may be engaged with similar teeth 32 on an endwise movable starter shaft 34. This is the usual hand starting crank for manually rotating the crankshaft for starting.

In this invention the inertia members 16 are yieldingly urged to a neutral position and are frictionally retarded in their partial rotation or oscillation, by means resiliently connecting them to a crankshaft part. The bearing member 17 has mounted upon or formed integral with it two opposite, radially extending arms 36, these arms extending from the middle portion or flange 21 of the member 17 to positions between the segmental body portions of the inertia member 16, and somewhat spaced therefrom. Between these arms and the body portions of the inertia members 16 are coil springs 37, the arrangement of parts being such as to place these springs under compression when they are in place. Depressions 38 are formed in the arms 36 and similar depressions 39 are formed in the overhanging weight portions or body portions of the inertia member 16, to receive the ends of the springs and retain them against displacement.

With the above construction it is evident that the springs 37 will exert against each of the inertia members a pressure S, and as the springs are of equal strength and act through equal and opposite lever arms $a$ it will be readily understood that they exert equal and opposite moments $Sa$, $S'a$, and $S_1a$, and $S'_1a$, urging the inertia member toward its neutral position, as shown in the diagram in Fig. 3. It will also be apparent that as the reaction of the springs is transmitted through the arms 36 to the bearing member 17, the sum of the pressures S and S' is exerted between this bearing member and each of the inertia members. These pressures are illustrated in Fig. 3 by the reference characters R and R', and they serve to greatly increase the frictional resistance to oscillation, due to the increased pressure on the bearing surfaces, indicated at P and $P_1$. The various bearing surfaces may be lubricated in any suitable manner, if desired.

The operation of this device may be described as follows: When the crankshaft is rotating smoothly at a uniform velocity, the weight or inertia members 16 are carried along with it so that there is little or no relative movement between these members and the shaft. Upon the inception of a torsional vibration, however, the motion of the shaft changes and alternating forward and backward rotary movements of relatively small amplitude and high frequency, which constitute the vibratory disturbance, are superposed on the continuous forward rotary movement of the shaft. By reason of these alternating movements, the shaft has high accelerations which are alternately positive and negative, and the weight members because of their considerable inertia, cannot follow these alternations but tend to continue their unidirectional rotation at a constant velocity. Hence there is slippage between these members and their respective bearings 20 so that they have a movement relative to the shaft which is oscillatory in character, corresponding to the vibratory alternations of movement of the shaft. This movement takes place against the spring pressure and against the frictional resistance at the bearings as explained above. The energy necessary to cause this oscillatory movement of the inertia member against the frictional drag is subtracted from the energy of vibration with the result that the amplitude of this disturbance is controlled so that the vibration is unobjectionable.

By increasing the angle through which the inertia members are permitted to oscillate the damping effect may be increased, since the distance through which the frictional force acts, and consequently the amount of work done against this friction, is thereby increased. By choosing springs of proper strength and by the use of inertia members of sufficient weight, the frictional dissipation of energy may be made sufficient to damp vibration of any extent which may be encountered in practice in any and all parts of the engine speed range.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent, is:

1. In a vibration damper for internal combustion engines having a shaft, a member secured to the shaft having spaced bearings, inertia members pivotally mounted on said bearings, a flange between the bearings integral with the bearing member and having laterally disposed arms arranged between the inertia members, and springs between the ends of the arms and each of the inertia members.

2. The combination in an internal combustion engine having a crankshaft, of a vibration damper comprising a bearing member keyed to the shaft for rotation therewith and having spaced bearings, oppositely disposed inertia members each having an attachment portion pivotally mounted on the respective bearings and each having a weight or body portion arranged to overhang the attachment portion of the other, laterally projecting arms on the bearing member between the bearings thereon and disposed between said overhanging portions, and springs between the end of each arm and the adjacent weight or body portions adapted to urge the inertia members to neutral position with respect to the arms.

3. The combination in an internal combustion engine having a crankshaft, of a vibration damper comprising a bearing member keyed to the shaft for rotation therewith and having spaced bearings, inertia members mounted on the bearings, resilient means separating the ends of the inertia members, and arms rigidly secured to the bearing member connected to said resilient means.

4. The combination in an internal combustion engine having a crankshaft, of a vibration damper comprising a bearing member carried by the shaft, a pair of opposed inertia members pivotally mounted thereon, resilient means between the inertia members and bearing member to restrain oscillatory motion of the inertia members on the bearing member, and means to positively position said inertia members and said bearing member axially of the shaft.

5. The combination in an internal combustion engine having a crankshaft, of a plurality of inertia members rotatively connected to the crankshaft, resilient members to resist movement of said inertia members with respect to said crankshaft, and a member rigidly secured to the crankshaft forming a common abutment for said resilient members.

6. The combination in an internal combustion engine having a crankshaft, of a bearing member secured to said shaft having integral radially disposed arms, inertia members journaled on said bearing member on either side of the arms and having portions overhanging said arms, and springs between each arm and the overhanging portions.

7. A vibration damper for shafts, comprising a pair of similar inertia members of equal mass each having a journal portion and a weight or body portion, a bearing member fixed on said shaft and adapted to rotatively support said inertia members on the shaft so that said weight portion of each inertia member overhangs the journal portion of the other inertia member, and springs between said body portions and the bearing member.

8. The combination in an internal combustion engine having a crankshaft, of a vibration damper comprising opposed inertia members mounted to oscillate about the axis of said shaft, arms secured to the shaft to rotate therewith, and springs between the arms and said inertia members to urge said inertia members toward their neutral position.

9. The combination in an internal combustion engine having a crankshaft, of a vibration damper comprising opposed inertia members having bearing portions journaled to oscillate about the axis of the crankshaft, and having overhanging weight or body portions, a member secured to the crankshaft, and pairs of opposed springs between said member and each weight or body portion to resist oscillatory movement and to increase the friction at the journals.

10. The combination in an internal combustion engine having a crankshaft, of a vibration damper comprising a member secured on the shaft and having bearings separated by an intermediate flange portion, oppositely disposed radial arms on the flange portion having spring abutments adjacent their ends, oppositely disposed inertia members each having a portion journaled on one of said bearings and a portion overhanging the bearing portion of the other inertia member, and a pair of springs between the ends of each of the overhanging portions of the inertia members and said abutments to urge the inertia members toward their neutral position and to increase the frictional resistance to turning on the bearings.

11. The combination in an internal combustion engine having a crank shaft, of a vibration damper comprising a bearing member carried by the shaft, opposed inertia members pivoted thereon, and resilient spacing means between the inertia members and the bearing member.

12. The combination in an internal combustion engine having a crank shaft, of a vibration damper comprising a bearing member carried by the shaft, opposed inertia members mounted to oscillate on the bearing member, and means spacing the inertia members and the bearing member adapted to increase the friction between said inertia members and bearing member.

In testimony whereof I affix my signature.

WALTER R. GRISWOLD.